M. D. GATLING.
FERTILIZER DISTRIBUTER.
APPLICATION FILED AUG. 12, 1908.
909,997.
Patented Jan. 19, 1909.
2 SHEETS—SHEET 1.
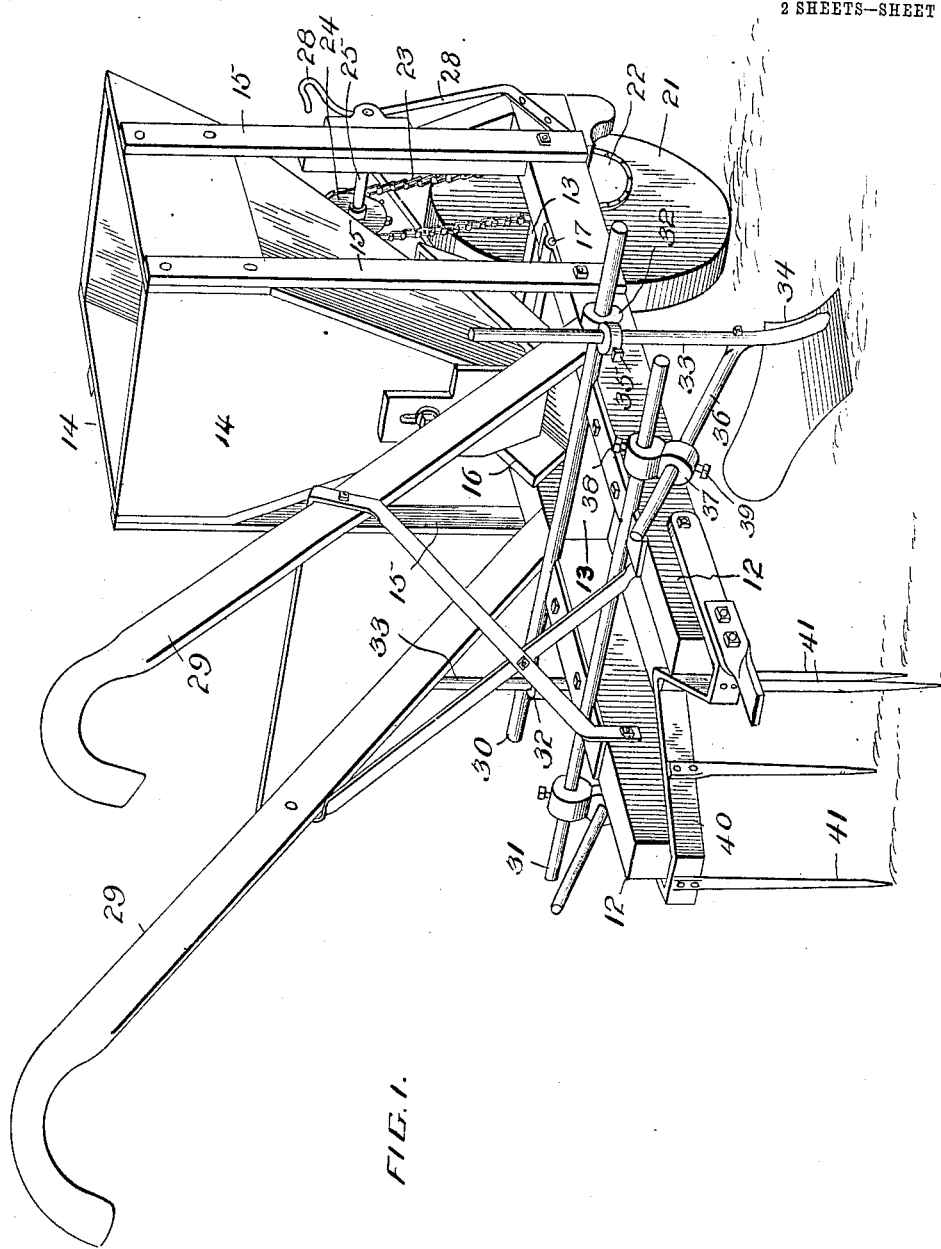
WITNESSES:
INVENTOR:
Mark D. Gatling
BY
Attorneys M. D. GATLING.
FERTILIZER DISTRIBUTER.
APPLICATION FILED AUG. 12, 1908.
909,997.
Patented Jan. 19, 1909.
2 SHEETS—SHEET 2.
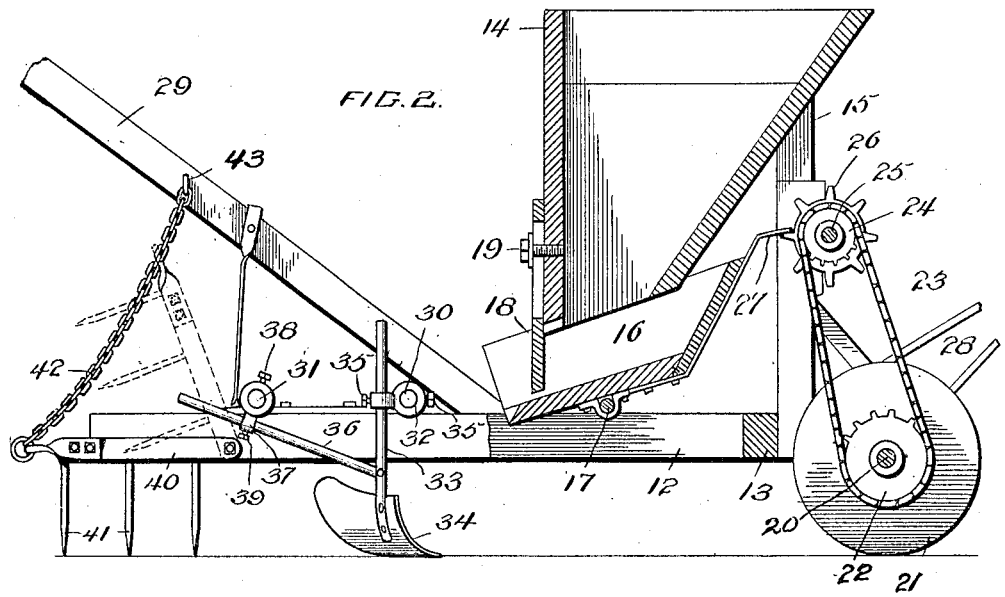
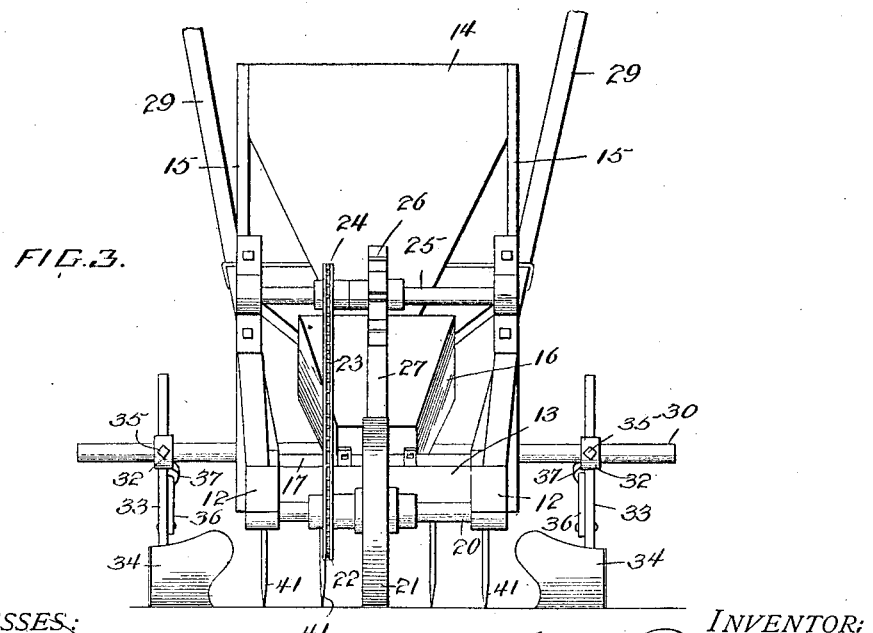

UNITED STATES PATENT OFFICE.

MARK D. GATLING, OF MAPLETON, NORTH CAROLINA.

FERTILIZER-DISTRIBUTER.

No. 909,997.  Specification of Letters Patent.  Patented Jan. 19, 1909.

Application filed August 12, 1908. Serial No. 448,203.

*To all whom it may concern:*

Be it known that I, MARK D. GATLING, a citizen of the United States, residing at Mapleton, in the county of Hertford and State of North Carolina, have invented or discovered certain new and useful Improvements in Fertilizer-Distributers, of which the following is a specification, reference being had therein to the accompanying drawings.

My invention relates to fertilizer distributers, and has for its object to provide an improved distributer which will be inexpensive to make, and which will be convenient and efficient in use.

In the accompanying drawings Figure 1 is a perspective view of my improved distributer. Fig. 2 is a side view of the same, partly in vertical section, and Fig. 3 is a front end view.

Referring to the drawings, the frame of the machine comprises longitudinal bars 12 and cross-bars 13 properly secured together and preferably of wood. The hopper 14 is supported on the frame by four uprights 15 which are secured to said frame and hopper. Beneath the hopper 14 is a vibrating receiving and distributing shoe 16 which is mounted on a cross-rod 17 preferably pivotally supported in suitable bearings on the machine frame. Adjustably attached to the hopper is a sliding gate 18 which may be secured in any desired position by a suitable set-screw, as 19, to regulate the discharge of the material.

Suitably journaled in the front end of the frame is a shaft 20 to which is attached the traction wheel 21 and a sprocket-wheel 22, the said wheel 22 being connected by a driving chain 23 with a second sprocket-wheel 24 on a shaft 25 on which is also mounted a toothed wheel 26 engaged by an arm 27 with which the shoe 16 is provided, so that the rotation of said toothed wheel will impart vibrating movements to said shoe, to discharge or dispense the fertilizing material from the hopper.

Secured to the forward end of the machine, in any suitable manner, is a draft-iron or drag-bar 28, provided, as usual, with a hook for the attachment of the draft animal. The machine is also provided with the usual steadying and guiding handles 29.

At the rear part of the machine frame are two cross-rods 30 and 31. Adjustably attached to the rod 30 are clips 32 which receive the shanks 33 of the right and left covering plows or listers 34, said shanks being adjustably secured in said clips 32 by set-screws 35, so that the said plows may be raised or lowered, as may be desired; and by adjusting the clips 32 in or out said plows may be located nearer together or further apart, to adapt the machine to different conditions of work. The shanks 33 of the plows 34 are steadied by brace-rods 36 passing through clips 37 adjustably attached to the cross-rod 31 by set-screws 38; and the said rods 36 are adjustably secured in said clips by set-screws 39. The construction just described permits the angles of inclination of the plows or listers 34 to be varied to suit different kinds of work, and the clips 37 may be adjusted in or out, with the clips 32, when necessary.

Hinged or pivotally attached to the rear end of the machine frame, and rearward of the covering plows 34, is a harrow or drag preferably consisting of an M-shaped metal frame 40 carrying a series of teeth 41. The free end of the said harrow or drag is preferably connected by a chain 42 with a hook 43 on one of the handles 29, so that the said harrow or drag may be raised or lowered, to vary its working position; or may be lifted, as denoted in dotted lines in Fig. 2, when not required for use.

From the foregoing it will be understood that the invention provides a simple and efficient fertilizer distributer, which may be made at comparatively little expense, and which will be convenient and efficient in use.

Having thus described my invention I claim and desire to secure by Letters Patent:—

1. In a fertilizer distributer, the combination with a suitable frame, a hopper mounted thereon, and means for dispensing material from said hopper, of a cross-rod mounted on said frame, clips adjustably secured to said cross-rod, and covering plows or listers provided with shanks adjustably secured in said clips.

2. In a fertilizer distributer, the combination with a suitable frame, a hopper mounted thereon, and means for dispensing material from said hopper, of a cross-rod mounted on said frame, clips adjustably secured to said cross-rod, covering plows or listers provided with shanks adjustably secured in said clips and brace-rods for steadying said shanks.

3. In a fertilizer distributer, the combination with a suitable frame, a hopper mounted thereon, and means for dispensing material from said hopper, of a cross-rod on said frame, clips adjustably secured to said cross-rod, plows or listers provided with shanks adjustably secured in said clips, a second cross-rod on said frame, clips also adjustably secured to said second cross-rod, and brace-rods connected with said shanks and adjustably secured in said last-named clips.

4. In a fertilizer distributer, the combination with a suitable frame, a hopper mounted thereon, and means for dispensing material from said hopper, of a cross-rod on said frame, clips adjustably secured to said cross-rod, plows or listers provided with shanks adjustably secured in said clips, a second cross-rod on said frame, clips also adjustably secured to said second cross-rod, brace-rods connected with said shanks and adjustably secured in said last-named clips, and a hinged harrow attached to said frame rearward of said plows or listers.

In testimony whereof I affix my signature, in presence of two witnesses.

MARK D. GATLING.

Witnesses:
 JOHN B. TRADER,
 JUNIUS VAUGHAN.